United States Patent
Sun

[11] Patent Number: 5,932,979
[45] Date of Patent: Aug. 3, 1999

[54] PWM SPEED-CONTROL APPARATUS FOR ELEVATORS

[76] Inventor: Wenlin Sun, 3-1 Xiaoheyanlu, Dadong District, Shenyang City, Liaoning, 110043, China

[21] Appl. No.: 08/860,201

[22] PCT Filed: Jan. 12, 1996

[86] PCT No.: PCT/CN96/00003

§ 371 Date: Jul. 11, 1997

§ 102(e) Date: Jul. 11, 1997

[87] PCT Pub. No.: WO96/21967

PCT Pub. Date: Jul. 18, 1996

[30] Foreign Application Priority Data

Jan. 12, 1995 [CN] China ................................. 95101056

[51] Int. Cl.$^6$ ............................................. H01R 39/46
[52] U.S. Cl. .................... 318/254; 318/439; 318/270; 318/380; 388/811
[58] Field of Search .................... 187/112, 103, 187/31, 52 R, 104, 119; 318/757, 759, 463, 282, 257, 808, 807, 811, 254, 439, 138, 810, 269, 270, 273, 274, 258, 375, 379, 380; 388/811, 810, 809, 903

[56] References Cited

U.S. PATENT DOCUMENTS

| | | |
|---|---|---|
| 4,503,940 | 3/1985 | Watanabe . |
| 4,520,296 | 5/1985 | Lepper et al. . |
| 4,611,153 | 9/1986 | Wesling . |
| 4,667,777 | 5/1987 | Nomura .................................. 187/289 |
| 4,804,067 | 2/1989 | Kahkipuro .............................. 187/296 |
| 5,162,711 | 11/1992 | Heckler .................................. 318/264 |
| 5,250,765 | 10/1993 | Mizuno et al. ......................... 187/316 |
| 5,466,998 | 11/1995 | Kinoshita et al. ...................... 318/375 |
| 5,644,202 | 7/1997 | Toriyama et al. ...................... 318/369 |
| 5,828,192 | 10/1998 | Kawaguchi et al. ................... 318/139 |
| 5,831,403 | 11/1998 | Kanki et al. ............................ 318/286 |
| 5,838,127 | 11/1998 | Young et al. ........................... 318/293 |
| 5,844,397 | 12/1998 | Konecny et al. ....................... 318/811 |

FOREIGN PATENT DOCUMENTS

| | | |
|---|---|---|
| 0409185 A2 | 1/1991 | European Pat. Off. . |
| 2087105 | 5/1982 | United Kingdom . |

Primary Examiner—Brian Sircus
Attorney, Agent, or Firm—Birch, Stewart, Kolasch & Birch, LLP

[57] ABSTRACT

A PWM speed regulating apparatus for DC elevator comprises a rectifier-filter (1), voltage suppressor (2), chopper voltage regulator (3), system controller (4) and a driving protector (5). The speed of DC motor is regulated by a pulse width modulating mode so that the current of the motor is maintained continuously and the ripple of current and torque is lower, and which ensures a good riding quality and a high floor arrival accuracy.

7 Claims, 3 Drawing Sheets

PWM SPEED-CONTROL APPARATUS FOR ELEVATORS

FIELD OF THE INVENTION

The present invention relates to a DC elevator, and more particularly, to a pulse width modulation (PWM) speed-control apparatus for controlling the speed of DC elevator.

BACKGROUND OF THE INVENTION

Presently, there are two kinds of conventional speed-control systems for a DC elevator, one of which is a generator-motor speed-control system excited with a silicon controlled rectifier (SCR), another is a SCR-motor speed-control system powered directly by a SCR. The elevator with the former speed-control system has some drawbacks, such as higher exhausted energy, larger room occupied by the elevator, higher noise, lower response speed and higher cost. The latter speed-control system has higher pulsating current and higher ripple torque, and its current is intermittent when the speed of elevator is low, because it is directly powered with the regulated voltage by SCR from an AC power supply. It is difficult to satisfy a passenger's comfort requirements so that its application to an elevator is limited. Furthermore, there are other drawbacks e.g., it has a lower power factor and needs larger-volume smoothing inductors and loop reactors etc.

SUMMARY OF THE INVENTION

The object of the invention is to provide a PWM speed-control apparatus for a DC elevator, which makes use of a microcomputer to create acceleration curve and deceleration curve, adjust its running process, and control its running state. The pulses for measuring speed and distance are produced by a photoelectric shaft encoder. The chopper voltage regulation is accomplished by PWM with fully controllable power electronic components.

Another object of the invention is to provide a DC elevator using the above-mentioned PWM speed-control apparatus for a DC elevator.

To achieve the objects, the invention provides a PWM speed-control apparatus for DC elevator, comprising a rectifier-filter for rectifying and filtering the power from AC power supply to convert it into DC power; a pump-rising voltage suppressor, connected between the DC output terminals of the rectifier-filter, for preventing over-voltage between the DC output terminals in a braking process of a motor; a chopper voltage regulator, having input terminals connected across the output terminals of the rectifier-filter and output terminals connected to an armature of a DC motor serving as major-governor, for converting the DC output voltage of the rectifier-filter into a controlled DC output voltage by PWM and supplying the controlled DC output voltage to the armature of the DC motor to control the rotating speed of the DC motor; a system controller receiving a pulse signal proportional to rotating speed of the DC motor from a photoelectric shaft encoder connected to the rotor of the DC motor to produce a PWM signal in response to a difference between an actual rotating speed and a setting speed of the DC motor; a driving protector receiving the PWM signal from the system controller to produce a control signal for driving the chopper voltage regulator; a current sensor for detecting an armature current of the DC motor to provide a current feedback signal to the system controller.

The invention further provides a DC elevator using the above-mentioned PWM speed-control apparatus for DC elevator.

The above object and features of the invention will be more apparent through the description of the preferred embodiments of the invention with reference to the drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
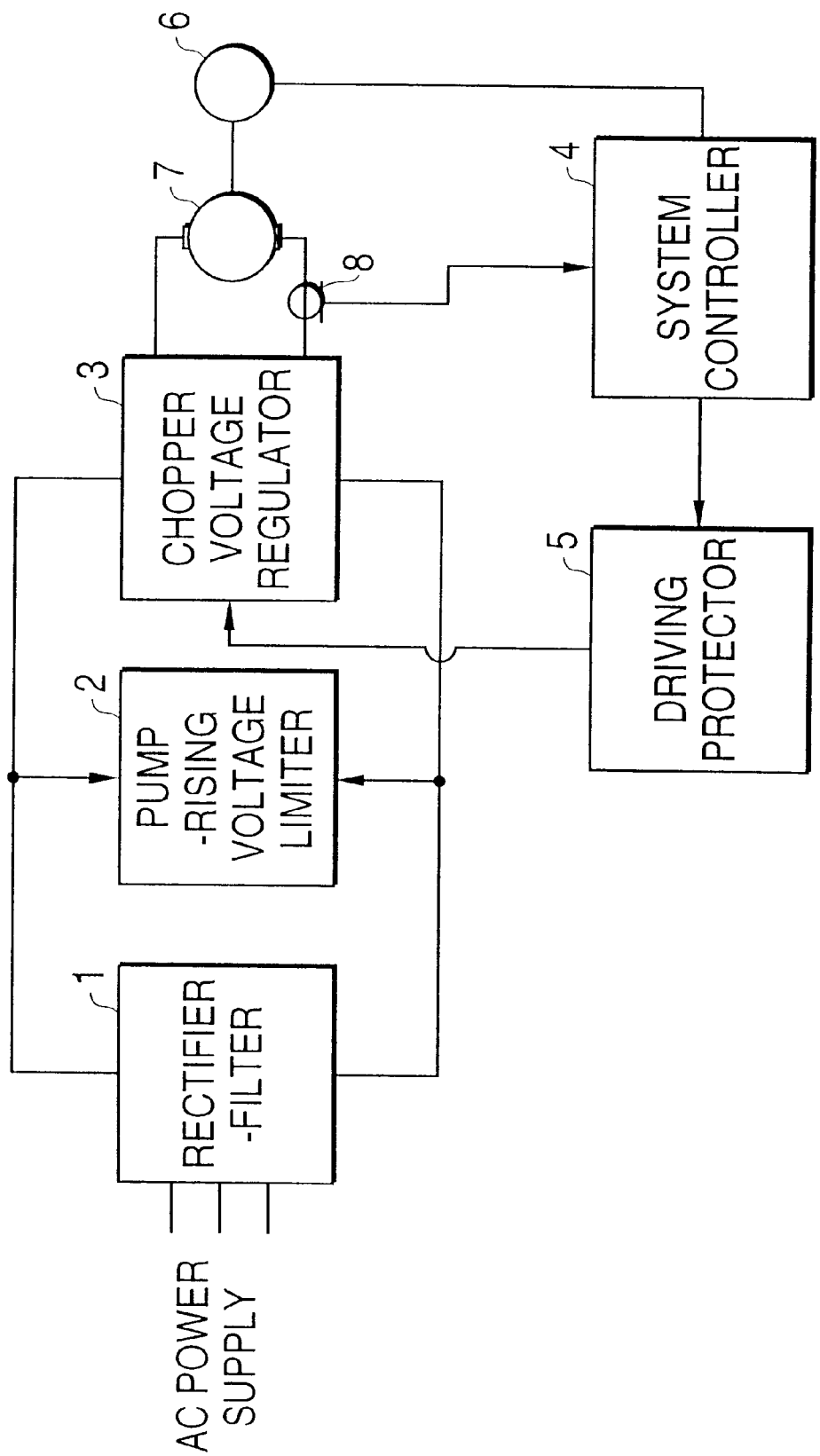
FIG. 1 is a schematic block diagram of a preferred embodiment of the PWM speed-control apparatus for DC elevator of the invention.

FIG. 1 is a schematic block diagram of the PWM speed-control apparatus for DC elevator of the invention. As shown in FIG. 1, the PWM speed-control apparatus for DC elevator of the invention includes a rectifier-filter 1 for rectifying and filtering the AC power from a three-phase AC power supply to convert it into a DC power; a pump-rising voltage suppressor 2, connected across the DC output terminals of the rectifier-filter 1, for preventing over-voltage between the DC output terminals when the DC motor 7 serving as major governor is in braking process. The rectifier-filter 1 and the pump-rising voltage suppressor 2 could be either two separated units or the transistor rectifier commonly used in prior art VVVF elevator with the function of limiting the pump-rising voltage, which can convert DC power into AC power or vice versa; a chopper voltage regulator 3, having input terminals connected across the DC output terminals of the rectifier-filter 1, and output terminals connected to the armature of the DC motor 7 serving as a major governor, for converting the DC output voltage of the rectifier-filter 1 into a controlled DC output voltage by PWM and then supplying it to the armature of the DC motor 7 to control the rotating speed of the DC motor 7; a system controller 4 receiving the pulse signals proportional to the rotating speed of the DC motor 7 from a photoelectric shaft encoder 6 connected to the rotor of the DC motor 7 to produce a PWM signal in response to a difference between an actual rotating speed and a setting speed of the DC motor 7; a driving protector 5 receiving the PWM signal from system controller 4 to produce a control signal for driving the chopper voltage regulator 3; a current sensor 8 for detecting the armature current of the DC motor 7 and providing a current feedback signal to the system controller 4.

Figure 2:
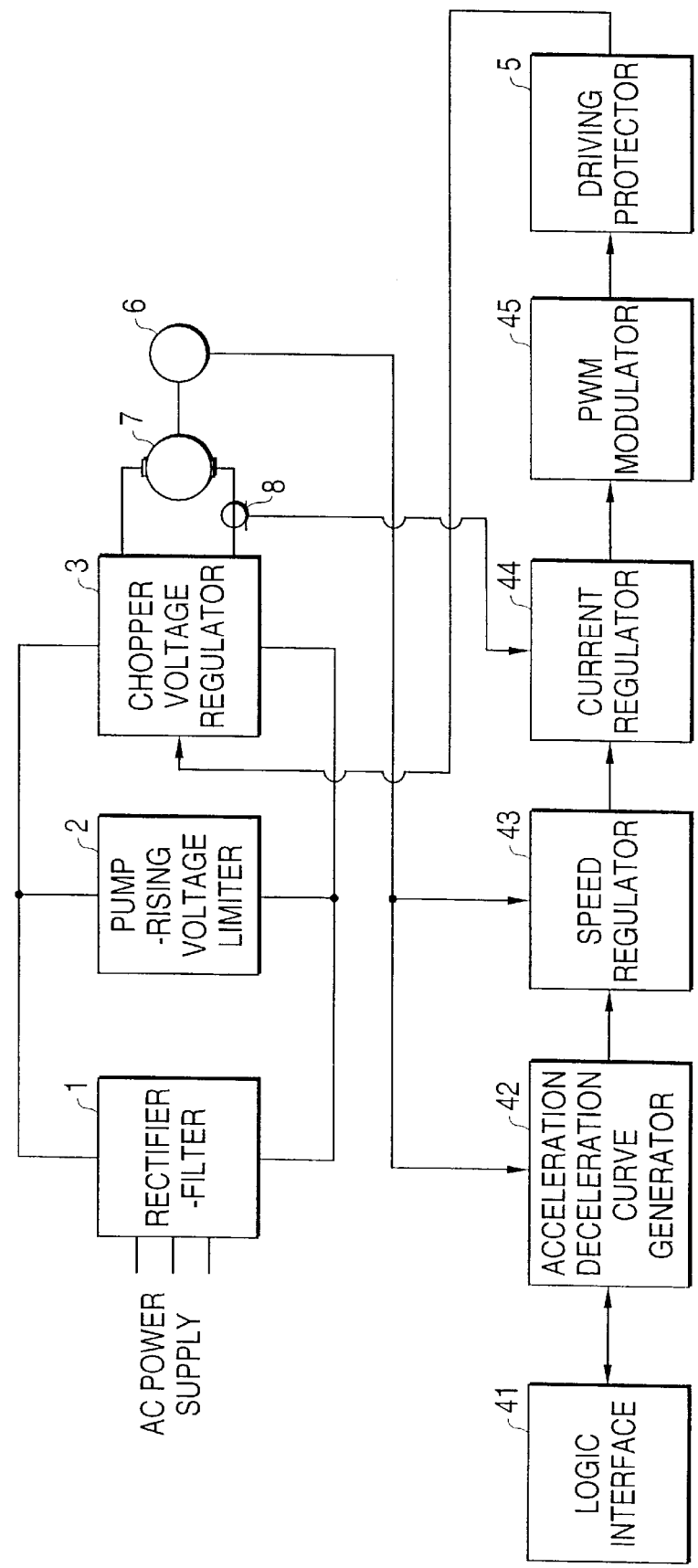
FIG. 2 is a working flow chart of the preferred embodiment of the PWM speed-control apparatus for DC elevator of the invention.

FIG. 2 is a working flow chart of the preferred embodiment of the PWM speed-control apparatus for DC elevator of the invention, wherein the same components as those in FIG. 1 are indicated by identical reference numerals. The system controller 4 as shown in FIG. 1 comprises a logic interface 41, an acceleration-deceleration curve generator 42, a speed-regulator 43, a current regulator 44 and a PWM modulator 45.

The working process of the PWM speed-control apparatus for DC elevator of the invention will be described with reference to FIG. 2.

AC power from three-phase AC power supply is converted into DC power by rectifying and filtering of the rectifier-filter 1, then supplied to the chopper voltage regulator 3. At a start point of the elevator, the logic interface 41 outputs a start command. After the accelerating-decelerating curve generator 42 receives the command, it produces accelerating curve (based on time principle) indicating that the speed setting signal increases progressively with time. The speed regulator 43 receives the speed setting signals and the speed feedback signals corresponding to the rotating speed of the DC motor 7 from the photoelectric shaft encoder 6 to produce a speed-adjusting output signal relating to their difference. The current regulator 44 receives the speed-adjusting output signal as a current setting signal and a current feedback signal from the current sensor 8 indicating the armature current of the DC motor 7 to produce a current regulating output signal in response to their difference. The PWM modulator 45 receives the current regulating output signal to generate a PWM pulse signal having a duty cycle corresponding to the amplitude of the current regulating output signal. The driving protector 5 amplifies the PWM pulse signal to drive the chopper voltage regulator 3 and prevents over-current by detecting currents of switching elements of the chopper voltage regulator 3. The chopper voltage regulator 3 outputs a DC voltage in response to the product of the voltage-regulating factor determined by the duty cycle of the PWM pulse signals from the driving protector 5 and the DC voltage from the rectifier-filter 1, and supplies it to the armature of the DC motor 7 to adjust the rotating speed of the DC motor 7 so that the elevator driven by the DC motor 7 runs based on the speed setting value on the accelerating curve, wherein the voltage-adjusting factor relates to the circuit structure of the chopper voltage regulator 3. If the chopper voltage regulator 3 is unipolar, limited unipolar or double frequency limited unipolar, the voltage adjusting factor is $K=\delta$. If the chopper voltage regulator 3 is bipolar, the voltage adjusting factor is $K=2\delta-1$ (wherein $\delta$ is the duty cycle of the PWM signals).

During the running process of the elevator, the logic interface 41 outputs a deceleration command after receiving a speed-changing command. The accelerating-decelerating curve generator 42 receives the deceleration command and the pulse signals proportional to the rotating speed of the DC motor 7 from the photoelectric shaft encoder 6, counts the pulse signals to get distance signals and generates a decelerating-curve indicating that speed setting signal decreases progressively with increase of distance based on the value of the distance signal (distance principle). The speed regulator 43 receives the speed setting signals and the speed feedback signals, corresponding to the rotating speed of the DC motor 7, from the photoelectric shaft encoder 6 to produce a speed adjustment output signal relating to the difference between the speed setting signals and the speed feedback signals. The current regulator 44 receives the speed-adjusting output signals as current setting signals as well as the current feedback signals from current sensor 8 indicating the armature current of the DC motor 7 to output a current-adjusting output signal in response to their difference. The PWM modulator 45 receives the current-adjusting output signals to produce PWM pulse signals having a duty cycle corresponding to the amplitude of the current-adjusting output signal. The driving protector 5 amplifies the PWM pulse signal to drive the chopper voltage regulator 3, and prevents over-current by detecting the current flowing through the switching elements of the chopper voltage regulator 3. The chopper voltage regulator 3 outputs a DC voltage in response to the product of the voltage-regulating factor determined by the duty cycle of the PWM pulse signals from the driving protector 5 and the DC voltage from the rectifier-filter 1, and then provides it to the armature of the DC motor 7 to adjust the rotating speed of the DC motor 7 so that the elevator driven by the DC motor 7 runs based on the speed-setting value on the decelerating curve.

Figure 3:
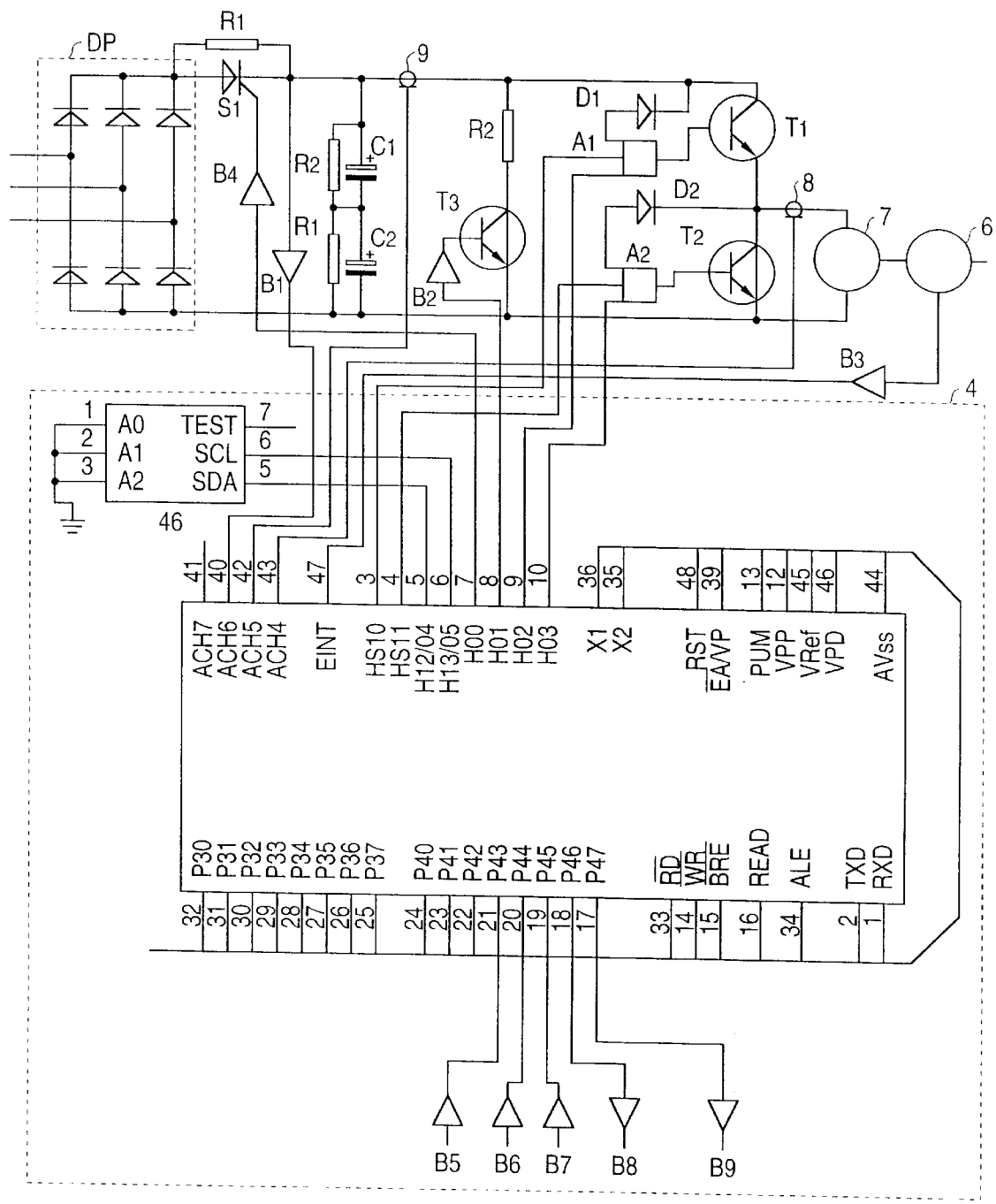
FIG. 3 is a circuit diagram of the preferred embodiment of the PWM speed-control apparatus for DC elevator of the invention.

FIG. 3 is a circuit diagram of the preferred embodiments of the PWM speed-control apparatus for DC elevator of the invention, wherein rectifier-filter 1 comprises a three-phase rectifying bridge DP, filtering capacitors C1, C2, voltage balance resistors R3, R4, a current-limit resistor R1, and a silicon controlled component S1. The resistor R1 is used to prevent current surge produced by capacitors C1, C2 when they begin to be electrified. The silicon controlled component S1 is used to make resistance R1 short circuit during normal operation. The pump-rising voltage suppressor 2 comprises transistor T3 and energy dissipate braking resistor R2. When the sum of the voltages across filtering capacitors C1 and C2 exceeds the DC output voltage of the three-phase bridge DP for some extent, the transistor T3 is turned on to consume the extra energy by means of energy dissipate braking resistor R2 so as to restrain the voltage across the filtering capacitor to increase. The chopper voltage regulator 3 comprises transistors T1 and T2. The transistors T1 and T2 may be switching elements such as full-controllable insulated gate field effect transistor (IGBT), and may be connected as half bridge (T-bridge) or full bridge (H-bridge), the resultant chopper voltage regulator 3 may operate in the state of generating and regenerative braking. The system controller 4, which is the major control unit of the PWM speed-control apparatus for DC elevator of the invention, can accomplish the function of the logic interface 41, the accelerating-decelerating curve generator 42, the speed regulator 43, the current regulator 44 and the PWM modulator 45. It comprises a microcomputer and other accessory circuits, mainly including CPU, program memory, data memory, timer, I/O interface, A/D converter, D/A converter and operational amplifier, etc. They can produce accelerating curve with digital integration or table looking-up, and produce decelerating-curve with calculating or table looking-up, then detect and adjust the speed of the elevator, and detect and adjust the armature current of the DC motor 7 to generating PWM pulse signals. The driving protector 5 is composed of special driving modules A1, A2 and fast-recovery diodes D1, D2. The special driving modules A1 and A2 may be selected as EXB851 produced by Fuji company. It can detect the collector voltage of the transistors T1 and T2 when they are on by means of the fast-recovery diodes D1 and D2. If the load short-circuits when the transistors T1 or T2 are on, its collector voltage may rise quickly, meanwhile the special driving modules A1, A2 can switch off the transistors T1 and T2 in the form of slowly-cutting off and sending their states back to the system controller 4 so as to limit the change rate of the current and the voltage, and protect transistors T3 and T4 to be in safe working area. Reference numerals 8 and 9 indicate Hall current sensors, wherein the Hall current sensor 9 is mainly used to prevent over-current caused by simultaneous turn-on state of the transistors T1 and T2, load short circuit or ground fault, etc. The Hall current sensor 8 is mainly used to regulate the current and limit it. Reference numerals B1–B9 indicate the amplifiers with the function of photoelectric isolation, which can amplify the signal and isolate the system controller 4 from the chopper voltage regulator 3. Reference numeral 46 indicates a electrically-erasable memory device to store parameters.

The DC elevator of the invention comprises door system, well-channel, car, logic signal control system, traction machine and the above-mentioned PWM speed-control apparatus.

INDUSTRIAL APPLICABILITY

In the PWM speed-control apparatus for DC motor of the invention, because it adopts PWM mode to govern the speed of the DC motor, the modulated frequency can be as high as several KHz to several tens KHz. Therefore its current is continuous, the current and the torque have a little ripple, and its speed-control process is stable so that the leveling accuracy and the comfort feeling are improved. Because a diode rectifier or transistor rectifier is used at the power supply side, the power factor is very high. Thus the interference to the electric network is low and the required power supply capacity is low. Also because it is unnecessary to use smoothing inductor and loop reactor, it has a smaller volume and a lighter weight. The switching elements can operate in their safe working area by detecting the current flowing through the same, and cutting off the circuit in the form of slowly-cutting. Thus the switching elements can not be damaged when a overload or a over-current occurs so that the reliability of the PWM speed-control apparatus for DC elevator is also improved.

I claim:

1. A pulse width modulation speed-control apparatus for a direct current elevator, comprising:

a direct current motor having an armature and a rotor;

an alternating current power supply providing alternating current power;

a rectifier-filter for rectifying and filtering the alternating current power, said rectifier-filter converting the alternating current power into direct current power;

a pump-rising voltage suppressor connected between direct current output terminals of the rectifier-filter, for preventing over-voltage between the direct current output terminals during braking processes of said direct current motor;

a chopper voltage regulator having input terminals connected across the direct current output terminals of said rectifier-filter and output terminals connected to said armature, said chopper voltage regulator employing pulse width modulation to convert direct current output voltage from said rectifier-filter into a controlled direct current output voltage and supplying the controlled direct current output voltage to said armature of said direct current motor, the direct current output voltage driving said direct current motor;

a photoelectric shaft encoder connected to said rotor for generating detected speed signals proportional to a rotational speed of said direct current motor;

a system controller receiving the detected speed signals from said photoelectric shaft encoder, said system controller producing a pulse width modulated signal in response to a difference between the detected speed signals of said direct current motor and a predetermined set speed of said direct current motor; and a driving protector receiving the pulse width modulated signal of said system controller, said driving protector producing a control signal for driving said chopper voltage regulator, whereby speed control of said direct current motor is stabilized which in turn substantially improves control of said direct current motor.

2. The apparatus of claim 1, wherein said system controller further includes a logic interface, an acceleration-deceleration curve generator, a speed-regulator, a current regulator, and a pulse width modulator.

3. The apparatus of claim 1, wherein said chopper voltage regulator includes transistors.

4. The apparatus of claim 1, wherein said rectifier-filter includes a three-phase rectifying bridge, filtering capacitors, voltage balance resistors, at least one current limiting resistor, and a silicon controlled component.

5. The apparatus of claim 1, wherein said pump-rising voltage includes a transistor and an energy dissipating braking resistor.

6. The apparatus of claim 1, wherein said driving protector includes driving modules and diodes.

7. A direct current elevator system comprising:

a door system;

a well channel;

a car;

a logic signal control system;

a traction machine;

a pulse width modulation speed-control apparatus including:

a direct current motor having an armature and a rotor;

an alternating current power supply providing alternating current power;

a rectifier-filter for rectifying and filtering the alternating current power, said rectifier-filter converting the alternating current power into direct current power;

a pump-rising voltage suppressor connected between direct current output terminals of the rectifier-filter, for preventing over-voltage between the direct current output terminals during braking processes of said direct current motor;

a chopper voltage regulator having input terminals connected across the direct current output terminals of said rectifier-filter and output terminals connected to said armature, said chopper voltage regulator employing pulse width modulation to convert direct current output voltage from said rectifier-filter into a controlled direct current output voltage and supplying the controlled direct current output voltage to said armature of said direct current motor, the direct current output voltage driving said direct current motor;

a photoelectric shaft encoder connected to said rotor for generating detected speed signals proportional to a rotational speed of said direct current motor;

a system controller receiving the detected speed signals from said photoelectric shaft encoder, said system controller producing a pulse width modulated signal in response to a difference between the detected speed signals of said direct current motor and a predetermined set speed of said direct current motor; and a driving protector receiving the pulse width modulated signal of said system controller, said driving protector producing a control signal for driving said chopper voltage regulator, whereby speed control of the elevator is stabilized which in turn substantially improves leveling accuracy and riding comfort of the elevator.

* * * * *